(12) United States Patent
Nelson et al.

(10) Patent No.: US 9,095,776 B2
(45) Date of Patent: Aug. 4, 2015

(54) VIDEO GAME EXTREMITY CONTROL AND OBJECT INTERACTION

(75) Inventors: Dan Nelson, Woodland Hills, CA (US); Ben Kutcher, Woodland Hills, CA (US); Cody Pierson, Woodland Hills, CA (US); Chad Findley, Woodland Hills, CA (US)

(73) Assignee: Activision Publishing, Inc., Santa Monica, CA (US)

( * ) Notice: Subject to any disclaimer, the term of this patent is extended or adjusted under 35 U.S.C. 154(b) by 2027 days.

(21) Appl. No.: 11/967,962

(22) Filed: Dec. 31, 2007

(65) Prior Publication Data

US 2009/0170605 A1 Jul. 2, 2009

(51) Int. Cl.
A63F 13/00 (2014.01)
A63F 13/40 (2014.01)

(52) U.S. Cl.
CPC ........... *A63F 13/10* (2013.01); *A63F 2300/105* (2013.01); *A63F 2300/6045* (2013.01); *A63F 2300/8041* (2013.01)

(58) Field of Classification Search
CPC ............ A63F 13/10; A63F 2300/8041; A63F 2300/6046; A63F 2300/105

USPC .......... 463/1–6, 40–42, 46, 47, 37–38, 30–33
See application file for complete search history.

(56) References Cited

U.S. PATENT DOCUMENTS 7,235,012 B2 * 6/2007 DiDato ........................ 463/38

OTHER PUBLICATIONS

Skate Game manual, released Sep. 13, 2007.*
Skate (Xbox 360) game review, written by Nick Suttner, posted Sep. 11, 2007, http://www.1up.com/do/reviewPage?cld=3162725.*

* cited by examiner

*Primary Examiner* — Ronald Laneau
*Assistant Examiner* — Ross Williams
(74) *Attorney, Agent, or Firm* — Klein, O'Neil & Singh, LLP

(57) ABSTRACT

Extremity control in a video game such as a skateboarding video game is provided through use of a video game controller. In some embodiments multi-axis controls of the video game controller are used to control extremities of a skateboarder character and to move a skateboard used by the skateboarder character responsive to movement of the extremities. For example, the skateboarder character's hands may grab the skateboard to perform a grab trick, or the skateboarder character may shift weight to perform a manual or similar trick.

17 Claims, 6 Drawing Sheets

VIDEO GAME EXTREMITY CONTROL AND OBJECT INTERACTION

BACKGROUND OF THE INVENTION

The present invention relates generally to multi-axis extremity control and inanimate object interaction in a video game, and more particularly to a skateboarding video game including multiple multi-axis extremity control and inanimate object interaction.

Video games are commonly used by many, generally providing a source of entertainment and at times a learning experience for a video game user. Video games often allow users to engage in an interactive visual experience, with the user generally operating controls to perform simulated actions, operate simulated items, and/or otherwise interact with a simulated environment. The simulated environment may be based on reality or entirely fanciful, with users controlling simulated characters taking on roles and performing actions that range from having some correspondence with every day reality to being completely divorced from the present world.

Many video games provide a user with some aspects of control of the movement of a simulated character. For example, performing a sequence of control operations, such as pressing a sequence of buttons on a game controller, may result in a simulated character executing a predefined sequence of maneuvers. Unfortunately, the predefined sequence of maneuvers may relate to various predefined maneuvers that encompass all of the simulated character's body, and thus a granularity of control of the simulated character is not provided to the user.

However, excessive detailed control of the simulated character may be undesirable in the context of a video game. For example, having to control in detail a simulated character's motions may be difficult, and users may be unable to accomplish control sufficient to allow game play. Moreover, requiring a detailed level of control may be wearying, and detract from overall game enjoyment.

SUMMARY OF THE INVENTION

The invention provides a video game including extremity control. In one aspect the invention provides a method of providing a video game, comprising: displaying on a display a game character and an object; modifying displayed position of each foot of the game character based on position of a corresponding multi-axis control of a pair of multi-axis controls of a game controller when the game is in a first mode; and modifying displayed position of each hand of the game character based on position of a corresponding multi-axis control of the pair of multi-axis controls of the game controller when the game is in a second mode.

In another aspect the invention provides a system for providing a skateboarding video game, comprising: a display; a game controller; a processor configured by program instructions to generate display information of a skateboarder character in operation of a skateboard, the program instructions including program instructions for: a normal skate mode; a trick skate mode, the trick skate mode including control of operation of feet of the skateboarder character with respect to the skateboard based on a first mapping of inputs from the game controller, control of operation of hands of the skateboarder character with respect to the skateboard based on a second mapping of inputs from the game controller, and control of weight distribution of the skateboarder character with respect to the skateboard based on a third mapping of inputs from the game controller.

These and other aspects of the invention are more fully comprehended upon review of this disclosure.

DETAILED DESCRIPTION

Figure 1:
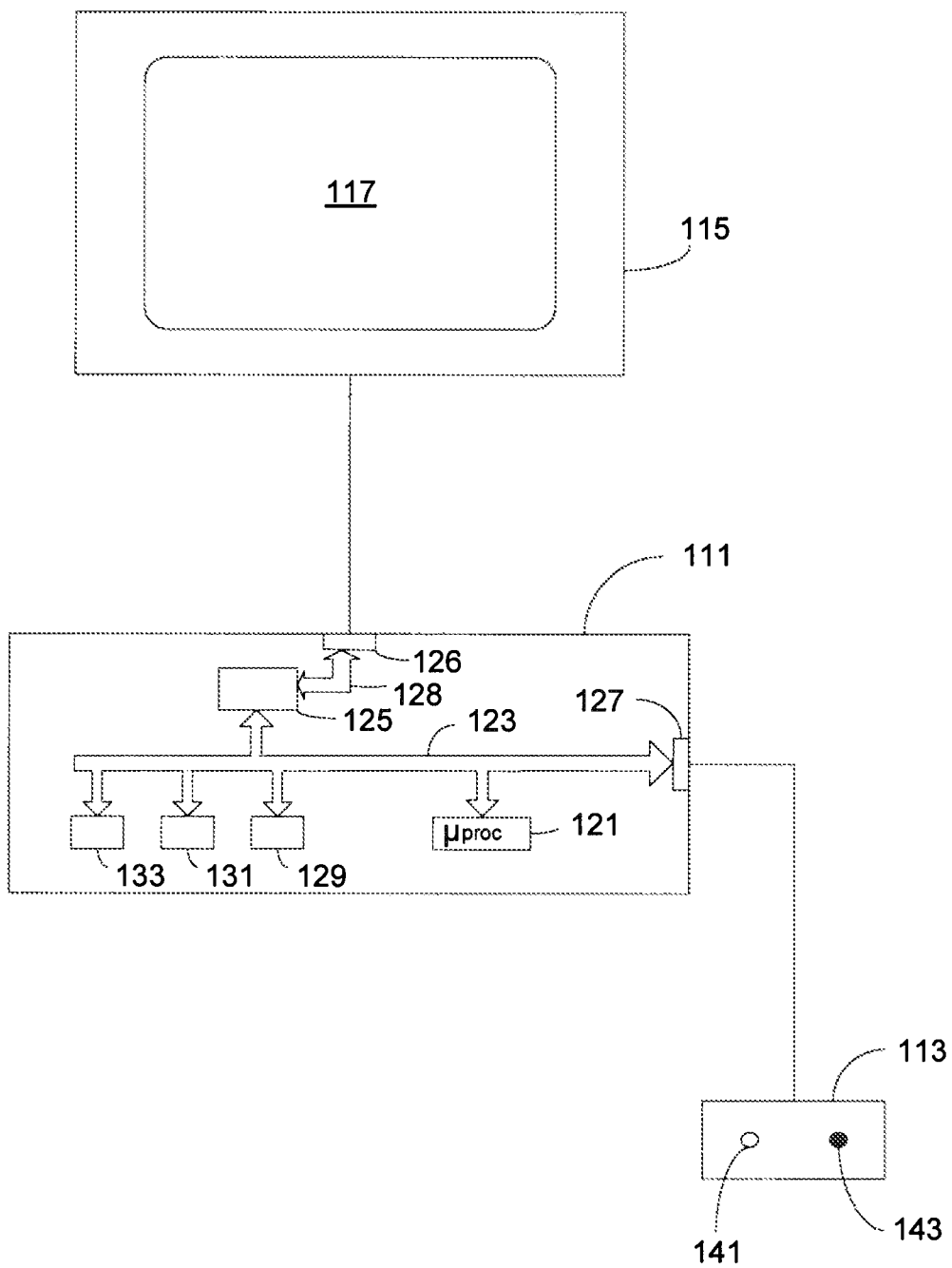
FIG. 1 is a block diagram of a video game system in accordance with aspects of the invention.

FIG. 1 is an example of a block diagram of a video game system in accordance with aspects of the invention. The system includes a video game console 111. The video game console is connected with one or more video game controllers 113 and a display unit 115, which houses a video display 117. The video game console receives inputs from the video game console, and the display unit displays video game action based on signals provided to the display unit by the video game console. The video game controller is generally adapted for use with the video game console, and in one embodiment may communicate with the video game console via a wireless connection.

The video game console performs video game processing. Accordingly, the video game console 111 includes a bus 123 coupled to a microprocessor 121, an input/output (I/O) port 127, a display driver 125, memory 129, an external memory interface circuitry 131, such as for a CD-ROM, and other circuitry 133 commonly found in devices which include a microprocessor. The display driver is connected to a second I/O port 126 by a separate bus 128.

The microprocessor 121, as illustrated in FIG. 1, is configured to communicate with each component coupled to the bus 123, and to execute instructions pertaining to video game play. In operation, the microprocessor commands retrieval of program instructions stored in the memory 129, executes the instructions, and provides data for storage in the memory and/or provides data to the display driver 125. The microprocessor and/or other devices on the bus use the memory to store information as needed. In many embodiments, program instructions and accompanying data for specific video games are originally stored in a CD-ROM, or other external memory source, which communicate with the video game console via the external memory interface 131, and transfer the program instructions to the memory at the command of the microprocessor. The program instructions and accompanying data may include game play instructions, video information, audio information, configuration information, and instructions for processing inputs from the controller. The display driver, which in some embodiments is implemented as part of the microprocessor, generates video game display information for provision to the display unit 115 by providing the display information over the second bus 128 to the second I/O port 126. Information from the second I/O port is provided to the display unit for display.

The video game controller 113, as illustrated in FIG. 1, includes a first input device 141 and a second input device 143. For convenience, the first input device may be considered a bi-directional, bi-input device, and the second input device may also be considered a bi-directional, bi-input device. Further, in many embodiments, the devices may provide multi-bit values or analog values. For example, in some embodiments each device may include a portion which detects movement in two axes or combinations thereof, by way of for example, a ball or stick moveable in at least two axes. Associated with each axis may be a potentiometer, with a voltage across each potentiometer varying based on position of the ball or stick on each axis. Each potentiometer may provide an analog signal of varying voltage, which in some embodiments may be converted by an analog-to-digital converter (ADC) to a multi-bit value. Thus, for example, the first input device may provide for two axes of control of a video game character's left extremity, such as an arm or a leg. Similarly, the second input device may provide for two axes of control of a character's right extremity, such as another arm or leg. In other embodiments one, three, or more input devices are used with the invention.

As seen in FIG. 1, signals from the input devices 141 and 143 of the video game controller 113 are provided to the I/O port 127 of the video game console 111, and the I/O port, which includes associated circuitry in most embodiments, provides the inputs to the microprocessor 121 or memory 129, depending on implementation. For example, if an input device on the video game controller is being used to control an extremity of a video game character, the microprocessor, in accordance with program instructions read from the memory, accesses the data from the input device, whether by way of the I/O port or the memory, and stores data representative of the position of the controlled extremity into the memory. The microprocessor also provides simulated position information of the extremity to the video driver 125, either in the form of position information or, depending on the implementation, image data. In many embodiments the position information is also used to determine position of an object associated with the controlled extremity.

Figure 2:
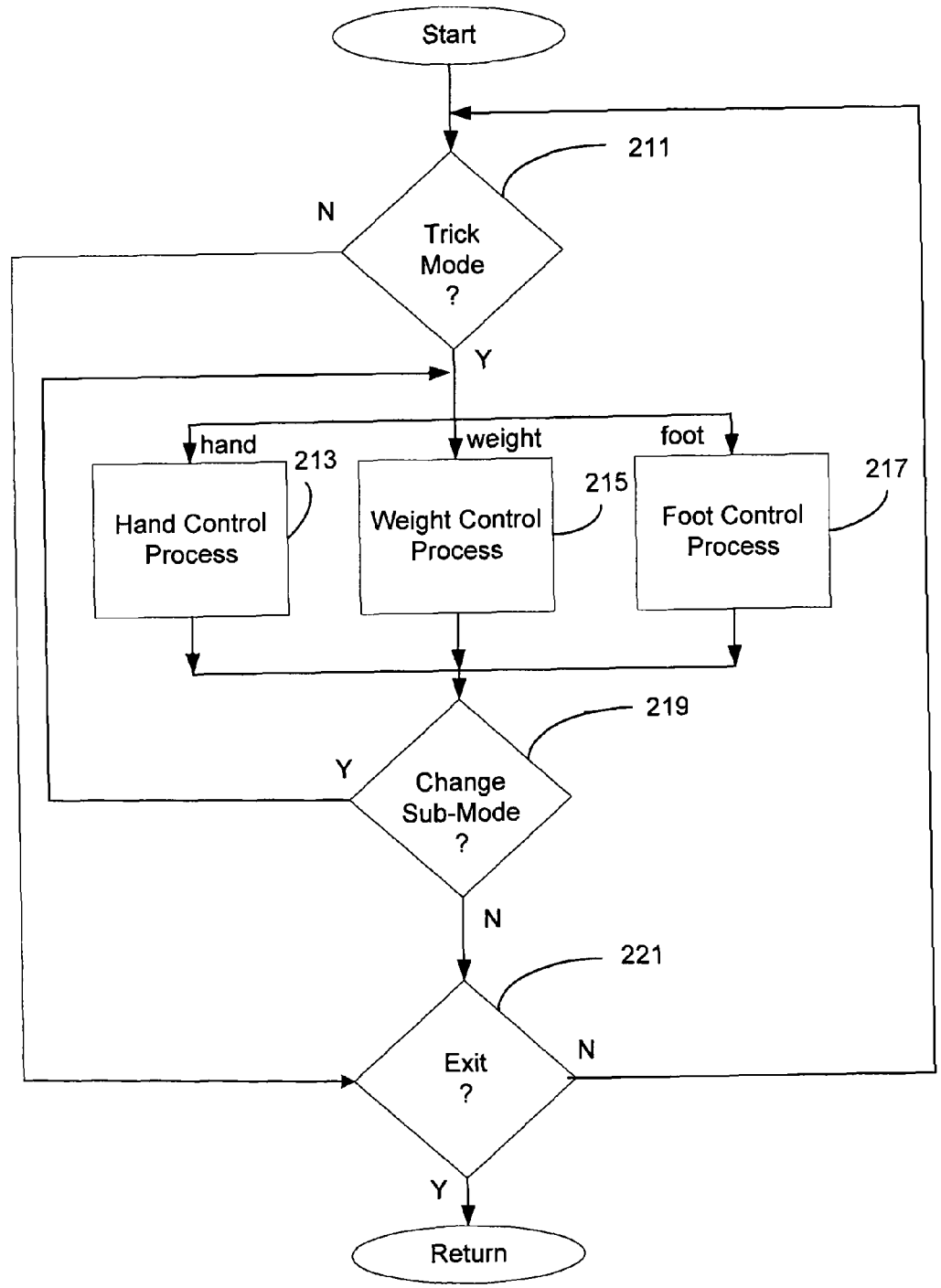
FIG. 2 is a flow diagram of trick mode processing in accordance with aspects of the invention.

FIG. 2 is a flow diagram of a process of performing extremity and object control in accordance with the invention. In particular embodiments the process is performed in the context of a skateboarding game in which a user, through a game character, operates a skateboard. In some embodiments, the process may be performed, for example, by the system of FIG. 1. In block 211, the process determines whether a trick mode is active. In some embodiments, trick mode is entered in response to specific predefined inputs from an input device. For example, an input device may have two multi-axis controls that each include a depressible switch, and depressing both multi-axis controls commands entry into the mode. In some embodiments, trick mode can be entered at any point in the game. In other embodiments, trick mode may only be entered under specific circumstances, for example when a video game character such as a skateboarder is airborne.

Generally, the trick mode will differ from other game modes. In some embodiments, multi-axis input controls may be used to dictate the movement of a variety of extremities or objects. This may be accomplished through a mapping of inputs from a video game controller to functions, such as specific actions of a skateboarder character's legs, that are different from other modes. In some such embodiments, signals from the video game controller's multi-axis input controls are mapped to the positioning and movement of the skateboarder's feet. In some embodiments, this trick mode may be characterized by an elapse of simulated time of the video game that is distinct, for example slower, from other modes in the game. In such embodiments, the elapse of time is slowed to provide for what is generally considered slow motion to facilitate, for example, the execution of more precise, or a greater number of, skateboarding tricks during the slow motion period. Also, in some embodiments, during trick mode the skateboarder character is displayed so as to view a rear or backside of the skateboarder character, allowing for example for increased consistency of mapping of controls of a controller to skateboard character extremities.

If trick mode is not active, the process continues to block 221 and determines if the process should return. If not, the process again determines if trick mode is active in block 211. If, however, trick mode is active, then the process proceeds to one of block 213, block 215, or block 217, depending on whether the trick mode is a hand (and/or arm) control trick mode, a weight control trick mode, or a foot (and/or leg) control trick mode, respectively. Each of the hand control trick mode, weight control trick mode, and foot control trick mode may be considered, in many embodiments, to be a sub-mode of trick modes. In other embodiments, there may be more or less than three sub-modes associated with trick mode. In one embodiment, entry into trick mode defaults to entry to the foot control trick mode, with hand control trick mode or weight control trick mode entered depending on the state of other inputs of the video game controller. For example a controller may include a right trigger control and a left trigger control. In some embodiments the process is in the hand control trick mode if the left trigger control is depressed, the weight control trick mode if the right trigger control is depressed, and the foot control trick mode otherwise, such as when both the left and right trigger controls are simultaneously depressed or released.

In block 217 the process performs foot control processing. In foot control processing, inputs from the video game controller are used to determine position, and therefore movement, of feet of a video game character, for example the feet, and the legs, of a skateboarder character. In some embodiments, the video game controller's multi-axis input controls are mapped to control the position and movement of the feet of a video game character such as the skateboarder character. As the skateboarder character's feet interact with a skateboard, control of the position and movement of the feet also controls position and movement of the skateboard. In some such embodiments, specific motions of the multi-axis inputs may correspond to specific foot movements, resulting in the video game character performing different tricks with the skateboard. In some embodiments foot control processing is performed as described in U.S. patent application Ser. No. 11/588,850, filed Oct. 27, 2006, the disclosure of which is incorporated in its entirety herein.

In block 213 the process performs hand control processing. In hand control processing, inputs from the video game controller are used to determine position, and therefore movement, of hands of the video game character, for example the hands, and the arms, of a skateboarder character. In some embodiments, the video game controller's multi-axis input controls are mapped to control the position and movement of the hands of a video game character such as a skateboarder character. More particularly, in some embodiments position and movement of the hands of the skateboarder character are used to determine interaction of the hands with the skateboard. In some such embodiments, specific motions of the multi-axis inputs may correspond to specific hand movements, resulting in the video game character grabbing the skateboard in a variety of ways, and performing different grab tricks with the skateboard.

In block 215 the process performs weight control processing. In weight control processing, inputs from the video game controller are used to determine shifts in weight, and some movement in many embodiments, of the video game character, for example a skateboarder character. In some embodiments, the video game controller's multi-axis input controls are mapped to control the direction of shift in weight of a video game character such as a skateboarder character. In some such embodiments, specific motions of the multi-axis inputs correspond to different shifts in weight, resulting in the video game character tilting the skateboard in a variety of different poses or positions, for example to perform tricks such as manuals, caspers, or similar tricks.

Generally, if a user is in one of the three sub-mode control processes discussed above, the user will have the option of remaining in that particular sub-mode control process, or of switching to another sub-mode control process. This may be done, for example, by a specific user input on the video game controller correlating to the exiting of the current or active sub-mode control process, and the subsequent entering of another sub-mode control process or the exiting of trick mode altogether. Accordingly, in block 219 the process determines if the sub-mode has changed, and if so goes to the new sub-mode. If not the process returns to block 221, and determines whether to return or to go to block 211 and continue processing. In many embodiments, there may be more or less than three sub-mode control processes from which the user can switch between.

Figure 3:
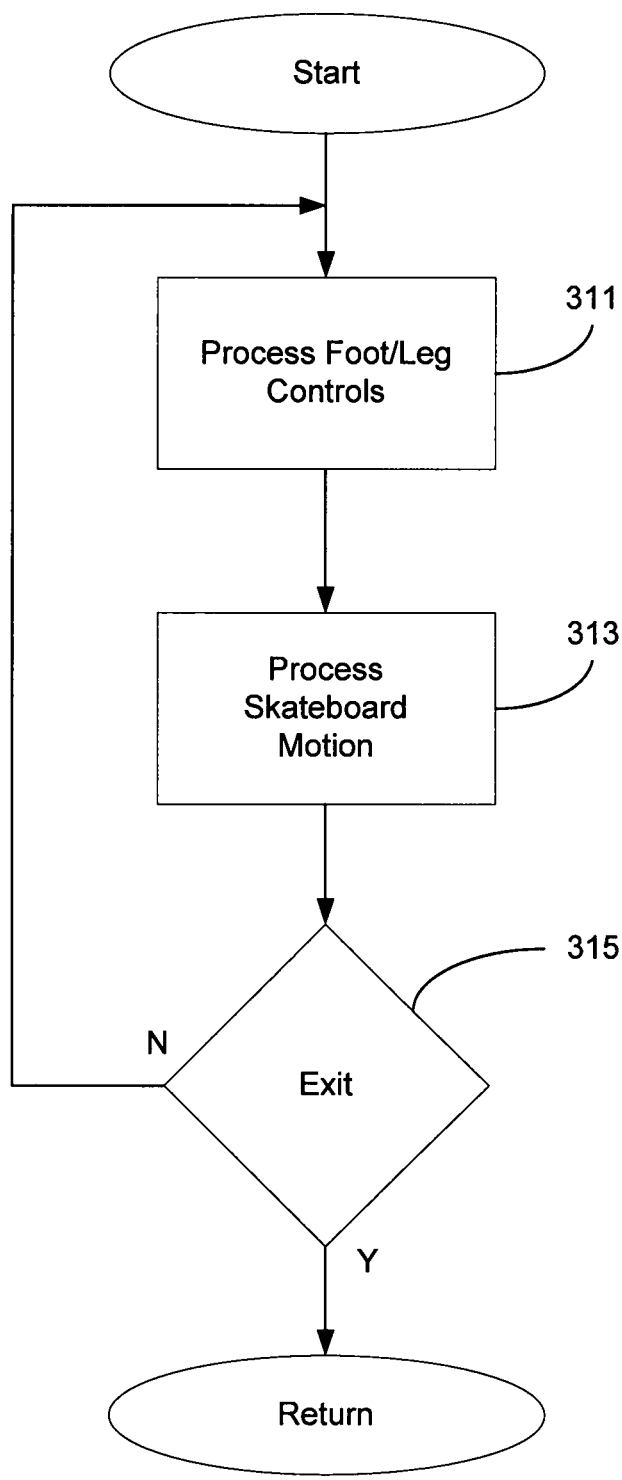
FIG. 3 is a flow diagram of a foot control process in accordance with aspects of the invention.

FIG. 3 is a flow diagram of an embodiment of a process for performing a foot movement trick mode within a skateboarding simulation game. In some embodiments the process may be performed, for example, as foot control process 217 of FIG. 2. In block 311, the process determines movement of the feet or legs of, for example, a video game character such as a skateboarder. In some embodiments, multi-axis input controls on a video game controller are used to dictate the movement of the character's legs or feet. For example, the process may compare motions from the multi-axis inputs with a mapping of pre-determined motions for the multi-axis inputs corresponding to specific leg or foot actions. In this way, multi-axis input controls may be used to control the positioning and movement of the feet of a video game character such as a skateboarder.

In block 313, the process determines skateboard motions associated with the leg or foot motions determined in block 311. In some embodiments, the process uses inputs from the multi-axis input controls of a video game controller to update the position and movement of an object in the video game such as a skateboard. In some such embodiments, the position and motion of the skateboard is dictated by the movement of the feet of, for example, a skateboarder in the video game being controlled by user inputs. The board position and motion may further reflect a movement of the skateboarder's foot kicking, shoving or hooking the board.

In exit block 315, the process determines whether the process should exit. In one embodiment, a specific user input in the video game controller will reinitiate the foot movement trick mode. In such an embodiment, a different user input in the video game controller may exit foot movement trick mode, and the process returns.

Figure 4:
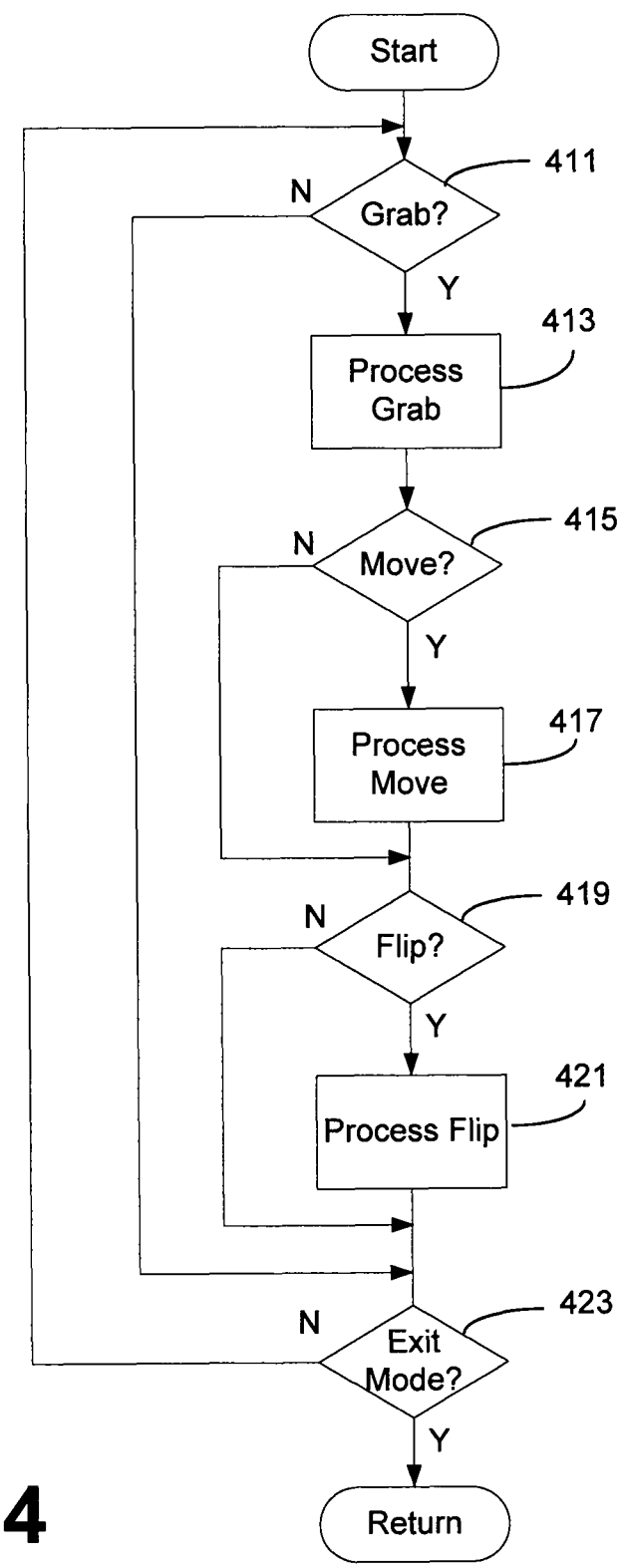
FIG. 4 is a flow diagram of a hand control process in accordance with aspects of the invention.

FIG. 4 is a flow diagram of an embodiment of a process for providing a hand movement trick mode within a skateboarding simulation game. In some embodiments the process may be performed, for example, as the hand control process 213 of FIG. 2. In block 411 the process determines if there has been a request for a skateboarder character to grab a skateboard. In some embodiments the process determines that a request for the skateboarder character to grab the skateboard has been made if a predefined input signal has been provided by a controller. In some such embodiments the predefined input signal indicates depression of a trigger button, for example a left trigger button, of the controller. In other embodiments the predefined input signal indicates movement of a multi-axis control of a controller to any of a plurality of predefined positions, or, considering that multi-axis controls may provide analog or multi-bit signals, within a predefined range of any of the plurality of predefined positions. If there has been a request to grab the skateboard the process continues to block 413. If there has not been a request to grab the skateboard the process continues to block 423.

Figure 6:
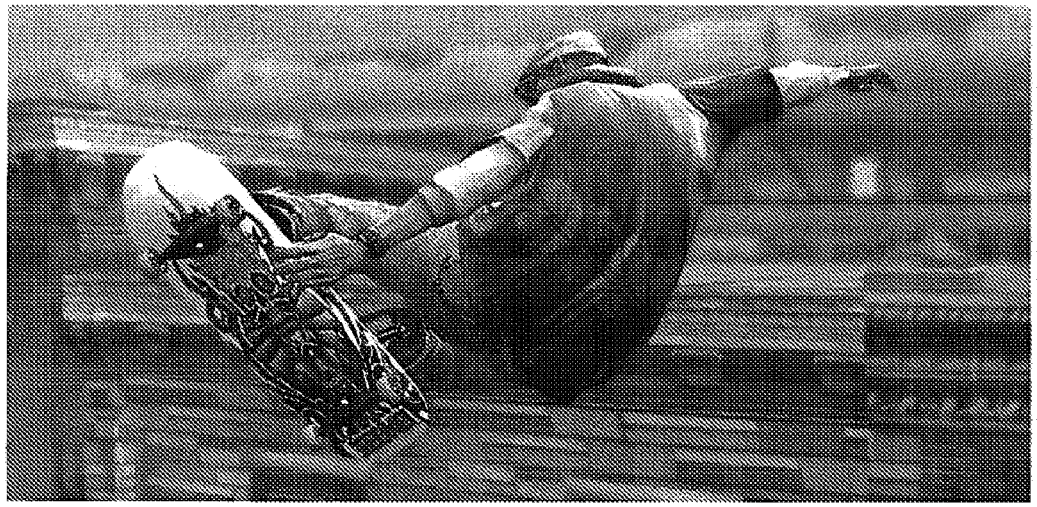
FIG. 6 is a screenshot of a display showing a grab trick in accordance with aspects of the invention.

In block 413 the process performs grab functions. Grab functions include determining placement of the skateboarder character's hand or hands on the skateboard. In some embodiments the process uses inputs from multi-axis controls of a controller to update skateboarder character hand position, particularly with respect to the skateboard. Thus, skateboarder character position data may be modified to reflect a hand of the skateboarder character grabbing the skateboard. For example, FIG. 6 shows a skateboarder character 611 whose left hand 613 has grabbed a skateboard 615.

In some embodiments predefined positions of multi-axis controls of the controller are mapped to predefined grab positions of the skateboard. For example, in some embodiments a first multi-axis control may be used to determine position of a first hand of the skateboarder character, with for example four different positions of the first multi-axis control corresponding to grabs of the skateboard by the first hand in four different positions. Similarly, a second multi-axis control may be used to determine position of a second hand of the skateboarder character, with for example four different positions of the second multi-axis control corresponding to grabs of the skateboard by the second hand in four different positions, some of which may be the same positions grabbed by the first hand. In some embodiments the four different positions are a nose of the skateboard, a tail of the skateboard, and mid-way along each side of the skateboard.

In most embodiments a left control of the controller is used for control of a left hand of the skateboarder character and a right control of the controller is used for control of a right hand of the skateboarder character. In addition, in most embodiments display of the skateboarder character is shown from the rear or backside for hand processing, thus the skateboarder character's left hand will be displayed towards the left side of the display and the skateboarder character's right hand will be displayed towards the right side of the display. Accordingly, there is a correspondence between location of the control used to control a skatebaorder character's hand and relative displayed position of the hand.

Further, in most embodiments there is a correspondence between relative motion of a control and displayed relative motion of a corresponding hand of the skateboarder character. For example, movement of the left control to the left results in displayed leftward movement of the skateboarder character's left hand, movement of the right control to the right results in displayed rightward movement of the skateboarder character's right hand, and so on. In this regard, with the skateboarder character viewed from the rear, locations behind the skateboarder character's feet are generally displayed below the skateboarder character's feet, and locations in front of the skateboarder character's feet are generally displayed above the skateboarder character's feet. Thus, downward movement of a control results in movement of the corresponding hand behind the skateboarder character, and upward movement of the control results the movement of corresponding hand skateboarder's character in front of the skateboarder character, with relative displayed movement of the hand matching relative motion of the control.

Thus, in some embodiments, when grab mode is activated, for example, by a trigger input, a left hand of the skateboarder character grabs a displayed left edge of the skateboard when the left multi-axis control is moved to the left, grabs the displayed lower edge of the skateboard when the left multi-axis control is moved rearward or down, and grabs the displayed upper edge of the skateboard when the left multi-axis control is moved forward or up. Similarly, in this embodiment, when grab mode is initiated, a right hand of the skateboarder character grabs the displayed right edge of the skateboard when the right multi-axis control has been moved to the right, grabs the displayed lower edge of the skateboard when the right multi-axis control is moved rearward or down, and grabs the displayed right edge of the skateboard when the right multi-axis control is moved forward or up. Thus, considering a skateboarder character with a normal stance, as opposed to a goofy foot stance, and with a skateboard in a normal riding position, in some embodiments a left hand of the skateboarder character grabs a nose of the skateboard when the left multi-axis control has been moved to the left, grabs a left side of the skateboard when the left multi-axis control is moved rearward or down, and grabs a right side of the skateboard when the left multi-axis control is moved forward or up. Similarly, a right hand of the skateboarder character grabs a tail of the skateboard when the right multi-axis control has been moved to the right, grabs a left side of the skateboard when the right multi-axis control is moved rearward or down, and grabs a right side of the skateboard when the right multi-axis control is moved forward or up.

In block 415 the process determines whether the skateboarder character is moving the grabbed skateboard. In some embodiments the skateboarder character is moving the skateboard if the multi-axis control corresponding to the hand grabbing the skateboard remains in the position in which the multi-axis control was placed to perform the grab of the skateboard. If the skateboarder character is moving the grabbed skateboard the process continues to block 417, otherwise the process continues to block 419.

In block 417 the process moves the skateboard with respect to the skateboarder character. In some embodiments the process moves the skateboard away from feet of the skateboarder character if the multi-axis control used to grab the skateboard remains in the position resulting in the grab. For example, in one embodiment, if the left multi-axis control was moved to the left, resulting in a grab of the displayed left edge of the skateboard, and the left multi-axis control remains to the left, then the skateboard is pulled to the left of the feet of the skateboarder character. Similarly, in this embodiment, the process may move the skateboard behind the skateboarder character's feet if the multi-axis control is maintained in the down position, in front of the skateboarder's feet if the multi-axis control is maintained in the up position, and to the right of the skateboarder's feet if the multi-axis control is maintained in the right position.

In block 419 the process determines whether a flip of the skateboard has been commanded. In some embodiments the process determines whether an input from the controller indicates a flip command. In some embodiments a flip is commanded if the multi-axis control used to perform the grab is moved in a one quarter turn. For example, assuming a grab has been performed using the left control by placing the left control to the left, a flip may be commanded by movement of the left control to the up position or the down position. If a flip command has been made the process continues to block 421, otherwise the process goes to block 423.

In block 421 the process flips the skateboard. In most embodiments the process flips the skateboard by rotation of the skateboard about an axis through a centroid of the skateboard, with the direction of rotation dependent on the direction of movement of the control used to grab the skateboard. For example, if an edge of the skateboard has been grabbed by the skateboarder character with the left hand, a quarter turn movement of the left control to the up position rotates the skateboard in a clockwise direction, and quarter turn movement of the left control to the down position rotates the skateboard in a counter-clockwise direction. In most embodiments, rotation of the skateboard may be stopped by re-grabbing the skateboard, or by landing the skateboard when the trucks are down.

In block 423 the process determines whether to return or to go to block 411. In most embodiments the process returns on exit of the hand control sub-mode, whether by entry to another trick mode or exit of trick mode. It should be noted, however, that in many embodiments a re-grab of the skateboard must be performed after a flip has been performed to successfully exit the mode and continue skating.

Thus, in some embodiments, after activating the hand control, or grab mode, operation of the multi-axis controls, or sticks, of a video game controller results in the skateboarder character grabbing the skateboard at any of four traditional grab points (nose, tail, toe-side or heel-side) depending on the grab trick to be executed (indy, melon, tailgrab, etc.) and the orientation of the board at the time the grab trick is to be executed. For example, in one embodiment, pushing the left stick down while a trigger button corresponding to grab mode is depressed may cause the hand on the left side of the screen to grab the displayed lower or rearward edge of the skateboard, resulting in a grab trick, whereas pushing the right stick to the right causes the hand on the right side of the screen to grab the displayed right edge of the skateboard. Continuing to hold the stick in the direction that caused the grab pushes the skateboard in that direction relative to the screen, thereby 'tweaking' the skateboard out. Subsequent motion of the grab-hand stick pushes or pulls the hand of the skateboarder, to provide for subsequent grab tricks.

In some embodiments, release of the trigger button corresponding to grab mode releases the grab, allowing for the commencement of a new grab trick. In other embodiments, re-centering the sticks may release the grab. Alternatively, a quick quarter-turn flip of the grab-hand stick results in a finger-flip. At "branch points" (i.e. where the trucks down), re-grabbing the board results in additional grab tricks and flipping or re-flipping the board results in new finger-flips. Re-grabbing within a small window of time during board rotation and when the upper surface of the board is near parallel to the skate surface while the trucks are down results in another grab trick, another finger-flip or a landing. If re-grabbing occurs outside of the small window, the skateboarder bails and exits the grab mode.

Figure 5:
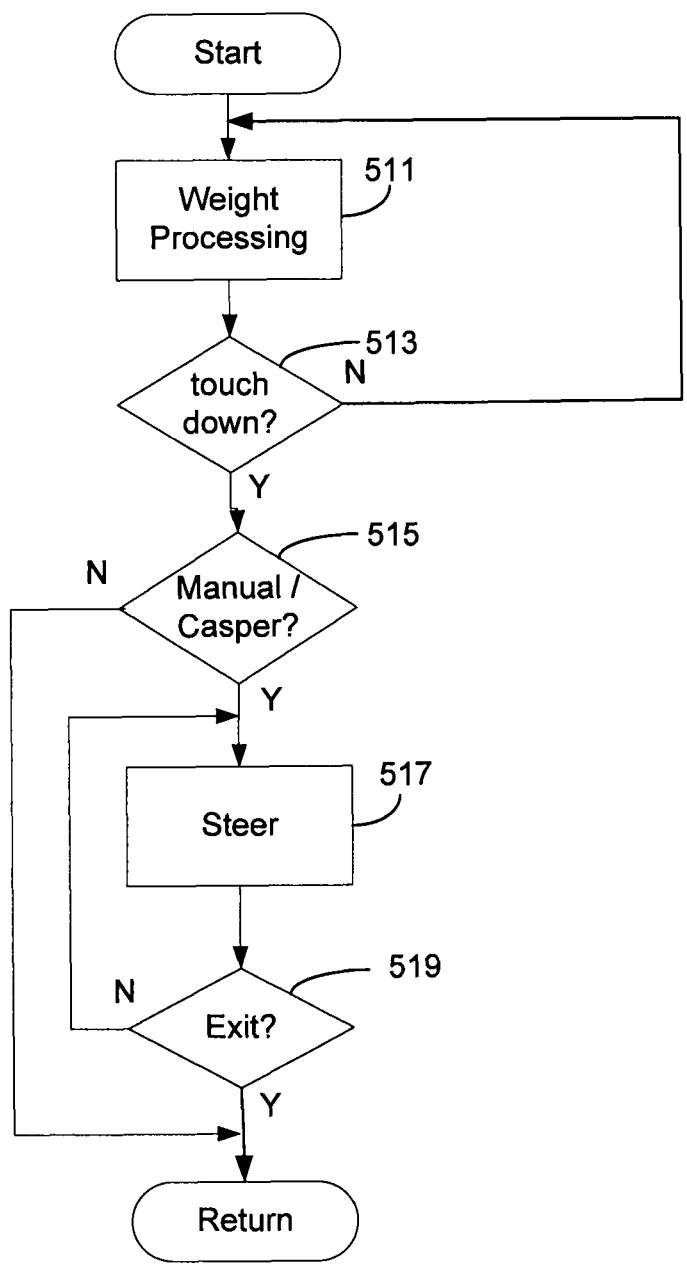
FIG. 5 is a flow diagram of weight control process with up/down foot control in accordance with aspects of the invention.

FIG. 5 is a flow diagram of an embodiment of a process for providing a weight shifting trick mode within a skateboarding simulation game. In some embodiments the process may be performed, for example, as the weight control process 215 of FIG. 2. In block 511 the process sets weight distribution of the skateboarder character with respect to the skateboard and positions the skateboard in accordance with the weight distribution of the skateboarder character. In most embodiments the process sets weight distribution of the skateboarder character based on input from game controller multi-axis controls. For example, in one embodiment placing the left multi-axis control in the down position moves the skateboarder character's left leg down, increasing weight on the left end of the skateboard and moving the left end of the skateboard down. Similarly placing the left multi-axis control in the up position moves the skateboarder character's left leg up, decreasing weight on the left end of the skateboard and moving the left end of the skateboard up. Operation of the right multi-axis control provides corresponding changes with respect to the skateboarder character's right leg, weight distribution, and skateboard position.

In block 513 the process determines whether the skateboard has made contact with the ground. In some embodiments the process compares location of the lowest part of the skateboard with location of the ground. In other embodiments the process retrieves positioning information for the skateboard and compares that information with a predetermined value that represents the position of the ground. In other embodiments the process calculates the time until the skateboard will make contact with the ground on the basis of direction, position and velocity information, then the process returns a false value until the time is exhausted or controller input is retrieved.

If the skateboard has made contact with the ground the process continues to block 515, otherwise the process returns to block 511.

Figure 7:
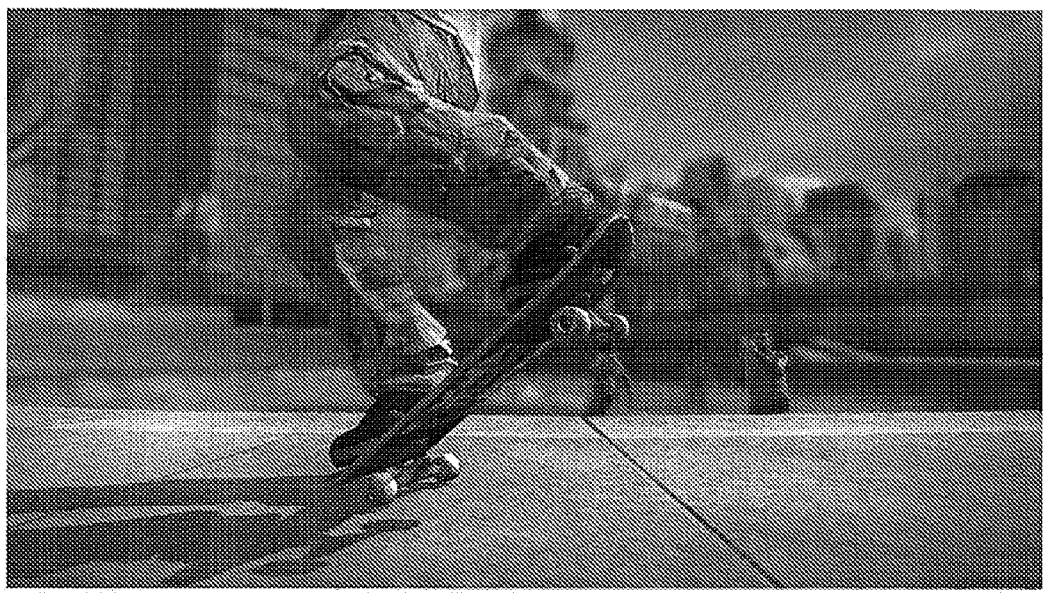
FIG. 7 is a screenshot of a display showing a manual trick in accordance with aspects of the invention.

In block 515 the process determines whether the skateboard is in a steerable position, which may be one of the following positions: manual, nose-manual, casper, or anti-casper position. In the manual position trucks of the skateboard face the ground and the nose of the skateboard is lifted off the ground. For example, FIG. 7 shows a skateboarder character 711 on a skateboard 713 in the manual position. As is later discussed, steering of the skateboard is provided in the manual position, as well as the other steerable positions.

The nose-manual position is similar to the manual position, except that tail of the skateboard is lifted off the ground instead of the nose of skateboard. The casper position and the anti-casper position correspond to the manual position and the nose-manual position, respectively, except the trucks are up. In some embodiments the process analyzes the board position data for numerous points on the board and compares the position data to predetermined values associated with each target position. In other embodiments the process performs a predetermined calculation on the board position data and compares the result to a value associated with each target position. If the skateboard is in a steerable condition the process proceeds to block 517, otherwise the process exits, for example to enter a process for continued skating, which depending on circumstances may include the skateboard character crashing or bailing.

In block 517 the process performs a steering function. The steering function provides for steering of the skateboard based on position of a multi-axis control of the game controller, for example the left multi-axis control. Thus, in one embodiment, direction of skateboard motion is towards the left with position of the left multi-axis control to the left, towards the right with position of the left multi-axis control to the right, and straight ahead otherwise. In addition, as the multi-axis control in many embodiments provides a multi-bit input, degree of turning to the left or the right depends on extent of movement of the left multi-axis control to the left or right, respectively. Moreover, in some embodiments the other multi-axis control, for example the right multi-axis control, or other controls may be used to continue weight distribution processing while the skateboard is steered. In some such embodiments overly distributing weight forward or backwards may result in a bail.

In block 519 the process determines whether the process should exit. In most embodiments the process exits if the skateboard once again becomes airborne, potentially entering a different trick sub-mode, or if the skateboard becomes horizontal due to changes in skateboard character weight distribution, with the game returning to a normal skate mode. The skateboard may become once again airborne, for example, by performance of an ollie, which may be accomplished for example by release of a button on the game controller, depression of which was used to command entry to the weight control sub-mode. In some embodiments the process additionally or instead determines if the skateboard is airborne by comparing skateboard position data with predetermined values representing position of the ground. In other embodiments, the skateboarder character may bail if the skateboard's tilt angle is too steep, and either the nose or tail of the skateboard grinds along the ground.

Thus, in the weight distribution mode, or manual mode, operation of multi-axis controls, or sticks, of a controller results in weight of the skateboarder character shifting either to the front or the back of the board. For example, pushing the left stick down results in weight shifting down on the left leg, helping to push the left end down and right end up and pushing the left stick up results in shifting weight off of the left leg, helping to push the left end up and right end down. The same is true for the right stick shifting weight down onto or up off of the right leg. This may continue until landing or touching down. When landing, if the skateboarder character's weight is suitably controlled and the trucks are down, the skateboarder lands in a manual or nose-manual where the toe-side or heel-side of the board is angled up from the skate surface at approximately 45 degrees. If the skateboarder's weight is suitably controlled and the trucks are up rather than down, the skateboarder lands in a casper or an anti-casper. Operation of the sticks further controls the skateboarder's weight in a manual or casper after landing. Operating the left stick left and right turns the skateboarder in the manual or casper.

Releasing a right trigger of the controller, in cases where depression of the right trigger of the controller resulted in entry to the manual mode, causes the skateboarder character to execute an Ollie and returns the player to trick mode where the player can wait until the skateboard lands or perform tricks in accordance with trick processing, for example as discussed with respect to FIG. 2. If operation of the sticks results in the skateboard being horizontal to the ground, or other skate surface, and the trucks are down, then the process exits the manual mode and returns to normal skating. If the trucks are up and the skateboarder character is in a casper or anti-casper when both ends of the board go down to the surface, the skateboarder character will bail.

The invention therefore provides extremity related control of a video game character, for example a skateboarder character in a skating video game. Although the invention has been described with respect to certain embodiments, it should be recognized that the invention may be practiced other than as specifically described, the invention comprising the claims and their insubstantial variations supported by this disclosure.

What is claimed is:

1. A method using a processor, a display, and a game controller of
providing a video game, comprising:
displaying on the display a game character having at least a pair of feet and a pair of hands and an object;

modifying, by the processor, displayed position on the display of each foot of the game character based on position of a corresponding multi-axis control input of a pair of multi-axis controls of the game controller when the game is in a first mode, the position of the corresponding multi-axis control input being received and mapped by the processor to control the position and movement of the corresponding foot of the game character such that the input of the relative motion of the corresponding multi-axis control corresponds to the displayed relative motion of the corresponding foot of the game character on the display;

modifying, by the processor, displayed position on the display of each hand of the game character based on position of a corresponding multi-axis control input of the pair of multi-axis controls of the game controller when the game is in a second mode, the position of the corresponding multi-axis control input being received and mapped by the processor to control the position and movement of the corresponding hand of the game character such that the input of the relative motion of the corresponding multi-axis control corresponds to the displayed relative motion of the corresponding hand of the game character on the display; and modifying, by the processor, position of the object in the video game and displaying the object in the modified position on the display based on the position and movement of at least one of the pair of hands and the pair of feet.

2. The method of providing a video game of claim 1 wherein at least some of the displayed positions of hands of the game character include positions with at least one hand shown as grabbing the object.

3. The method of providing a video game of claim 2 further comprising modifying displayed position of the object based on the position and movement of both of the pair of hands and the pair of feet.

4. The method of providing a video game of claim 3 wherein modifying displayed position of the object based on the position and movement of at least one of the pair of hands and the pair of feet is performed only if displayed position of at least one hand of the game character is shown as grabbing the object.

5. The method of providing a video game of claim 4 wherein modifying displayed position of the object based on the position and movement of at least one of the pair of hands and the pair of feet comprises rotating the object.

6. The method of providing a video game of claim 1 wherein the object is a skateboard.

7. The method of providing a video game of claim 6 wherein the first mode and the second mode are sub-modes of a trick mode.

8. The method of providing a video game of claim 7 further comprising modifying simulated weight distribution of the game character with respect to the skateboard in a third mode, the third mode being a further sub-mode of the trick mode.

9. The method of providing a video game of claim 6 wherein display of the game character and the skateboard comprises display of the game character and the skateboard off the ground in the first mode and the second mode.

10. The method of providing a video game of claim 8 further comprising providing a steering function in the third mode, the steering function changing display of skateboard direction of movement based on position of at least one multi-axis control.

11. A system for providing a skateboarding video game, comprising:
a display;
a game controller;
a processor configured by program instructions to generate display information of a skateboarder character in operation of a skateboard, the program instructions including program instructions for:
a normal skate mode;
a trick skate mode, the trick skate mode including control of operation of feet of the skateboarder character with respect to the skateboard based on a first mapping of inputs received from the game controller wherein a relative motion of the inputs corresponds to the displayed relative motion of the feet of the skateboarder character, control of operation of hands of the skateboarder character with respect to the skateboard based on a second mapping of inputs received from the game controller wherein a relative motion of the inputs corresponds to the displayed relative motion of the hands of the skateboarder character, and control of weight distribution of the skateboarder character with respect to the skateboard based on a third mapping of inputs received from the game controller wherein a relative motion of the inputs corresponds to the position of the skateboard in the video game and the displayed relative motion of the skateboard of the skateboarder character.

12. The system of claim 11 wherein the inputs from the game controller are inputs from multi-axis controls of the game controller.

13. The system of claim 12 wherein the processor is configured by program instructions to use the first mapping of inputs as a default in trick skate mode, to use the second mapping of inputs if a first button of the game controller is depressed in trick skate mode, and to use the third mapping of inputs if a second button is depressed in trick skate mode.

14. The system of claim 13 wherein the processor is further configured by program instructions to modify displayed position of the skateboard with respect to the skateboarder character, operation of the feet of the skateboarder character, operation of the hands of the skateboarder character, and weight distribution of the skateboarder character.

15. The system of claim 14 wherein the processor is further configured by program instructions to determine if the skateboard is airborne or on a skate surface.

16. The system of claim 15 wherein the processor is further configured by program instructions to transition from the trick skate mode to the normal skate mode if the skateboard transitions from being airborne to being on a skate surface and either the first mapping of inputs is active or the second mapping of inputs is active.

17. The system of claim 16 wherein the processor is further configured by program instructions to provide steering of the skateboard based on at least one input of the game controller when the skateboard is on a skate surface.

* * * * *